(12) United States Patent
Weldon et al.

(10) Patent No.: US 7,900,888 B2
(45) Date of Patent: Mar. 8, 2011

(54) IDLE AIR CONTROL VALVE BEARING IMPROVEMENT

(75) Inventors: Craig Andrew Weldon, Chatham (CA); Dian Hong, Wuhu (CN); Jian Tong, Wuhu (CN)

(73) Assignee: Continental Automotive Canada, Inc., Chatham, Ontario (CA)

( * ) Notice: Subject to any disclaimer, the term of this patent is extended or adjusted under 35 U.S.C. 154(b) by 373 days.

(21) Appl. No.: 11/984,920

(22) Filed: Nov. 26, 2007

(65) Prior Publication Data

US 2008/0121833 A1 May 29, 2008

Related U.S. Application Data

(60) Provisional application No. 60/867,299, filed on Nov. 27, 2006.

(51) Int. Cl.
*F16K 31/44* (2006.01)
(52) U.S. Cl. ............... 251/273; 251/267; 251/129.11
(58) Field of Classification Search ............ 251/364, 251/365, 366, 367, 373, 274, 129.11, 129.12, 251/129.13, 264, 265, 266, 267, 273
See application file for complete search history.

(56) References Cited

U.S. PATENT DOCUMENTS

| | | | | |
|---|---|---|---|---|
| 4,412,517 A * | 11/1983 | Kobashi et al. | ......... | 123/339.26 |
| 4,593,881 A * | 6/1986 | Yoshino | ......... | 251/124 |
| 5,533,661 A * | 7/1996 | Main et al. | ......... | 227/176.1 |
| 5,690,144 A * | 11/1997 | Takahashi | ......... | 137/625.43 |
| 6,105,485 A * | 8/2000 | Zittel | ......... | 99/348 |
| 6,460,567 B1 * | 10/2002 | Hansen et al. | ......... | 137/554 |
| 6,561,480 B1 * | 5/2003 | Komiya et al. | ......... | 251/129.12 |
| 6,674,208 B2 | 1/2004 | Ineson et al. | | |

* cited by examiner

*Primary Examiner* — John K Fristoe, Jr.

(57) ABSTRACT

An idle air control valve (11) for a vehicle includes a stator assembly (12) and a rotor assembly (26) operatively associated with the stator assembly and mounted for rotation with respect to the stator assembly. A shaft (36) is restricted from rotation and is associated with the rotor assembly such that rotation of the rotor assembly causes linear movement of the shaft. A pintle (38) is associated with a distal end of the shaft for linear movement therewith. A journal (28) is associated with the rotor assembly and is constructed and arranged to support and permit rotation of the rotor assembly relative to the stator assembly. Lubricant (30) is provided between a surface of the journal and a surface of the rotor assembly.

20 Claims, 1 Drawing Sheet

IDLE AIR CONTROL VALVE BEARING IMPROVEMENT

This application claims the benefit of the earlier filing date of U.S. Provisional Application No. 60/867,299, filed on Nov. 27, 2006, which is hereby incorporated by reference into this specification.

FIELD OF THE INVENTION

This invention relates to a vehicle idle air control valve (IACV) and, more particularly, to an improved bearing of the motor of an IACV.

BACKGROUND OF THE INVENTION

The IACV is a digital linear actuator (DLA) that accurately controls throttle airflow in an engine system. The need for using an IACV is that vehicle pollution emission control regulations require more precise air/fuel ratios and thus cleaner tailpipe emissions. The conventional IACV is an automotive grade can-stack style stepper motor which has been in production for 10-15 years.

The vehicle environment for which the IACV is used can be extreme from the cold temperatures of the arctic, to hot dusty deserts, to rain soaked jungles. Under normal vehicle driving conditions, the automotive intake manifold air filtration system is sufficient to protect the IACV from contamination. In the extreme vehicle applications, the IACV can be exposed to the following contamination: dust, moisture, fuel, EGR hot gas, carburetor cleaners, etc. The presence of contaminates in the IACV can lead to reduced component life and subsequent customer complaints or warranty returns.

The conventional IACV configuration has open ball bearings which are at risk to jamming or seizing due to contaminates, particularly in Asian environments. Asian motors can have "dirty" intake manifolds as compared to the NAFTA and European engines. The NAFTA-Euro engines are much cleaner in the sense of fuel vapor and wet exhaust gas recirculation are better designed or controlled within the intake manifold.

Thus, there is a need to provide an improved bearing of an IACV that is not prone to seize in harsh environments.

SUMMARY OF THE INVENTION

An object of the invention is to fulfill the need referred to above. In accordance with the principles of the present invention, this objective is obtained by providing a linear actuator including a stator assembly and a rotor assembly operatively associated with the stator assembly and mounted for rotation with respect to the stator assembly. A shaft is restricted from rotation and is associated with the rotor assembly such that rotation of the rotor assembly causes linear movement of the shaft. A journal is associated with the rotor assembly and is constructed and arranged to support and permit rotation of the rotor assembly relative to the stator assembly. Lubricant is provided between a surface of the journal and a surface of the rotor assembly.

In accordance with another aspect of the invention, an idle air control valve for a vehicle includes a stator assembly and a rotor assembly operatively associated with the stator assembly and mounted for rotation with respect to the stator assembly. A shaft is restricted from rotation and is associated with the rotor assembly such that rotation of the rotor assembly causes linear movement of the shaft. A pintle is associated with a distal end of the shaft for linear movement therewith. A journal is associated with the rotor assembly and is constructed and arranged to support and permit rotation of the rotor assembly relative to the stator assembly. Lubricant is provided, between a surface of the journal and a surface of the rotor assembly.

In accordance with yet another aspect of the invention, an idle air control valve for a vehicle includes a stator assembly and a rotor assembly operatively associated with the stator assembly and mounted for rotation with respect to the stator assembly. A shaft is restricted from rotation and is associated with the rotor assembly such that rotation of the rotor assembly causes linear movement of the shaft. A pintle is associated with a distal end of the shaft for linear movement therewith. Means, associated with the rotor assembly, is provided for supporting and permitting rotation of the rotor assembly relative to the stator assembly absent the use of ball bearings. Means, between a surface of the journal and a surface of the rotor assembly, is provided for lubricating.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing, wherein like reference numerals refer to like parts, in which.

DETAILED DESCRIPTION OF THE EXEMPLARY EMBODIMENTS

Figure 1:
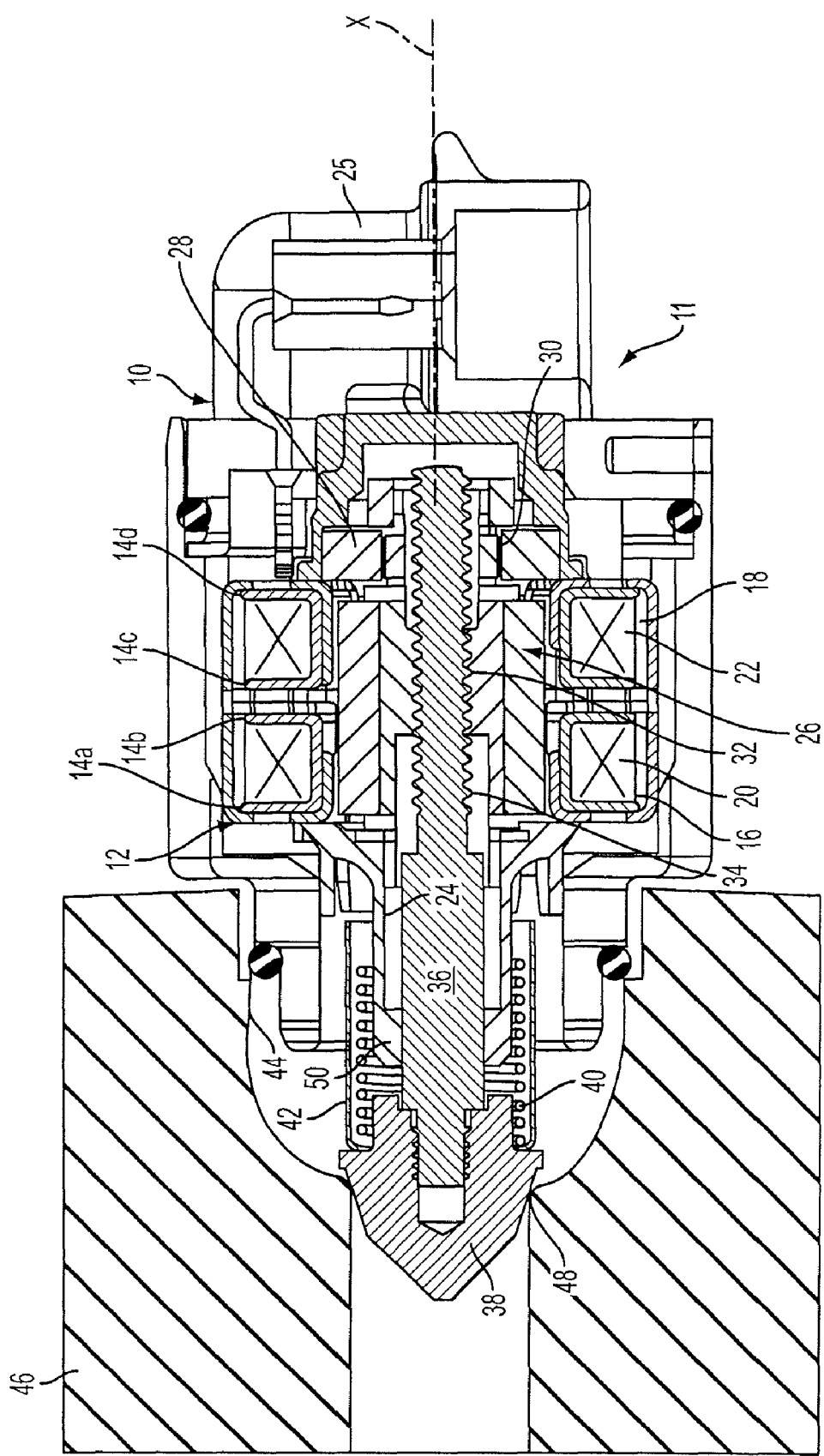
FIG. 1 is a longitudinal sectional view of an embodiment of digital linear actuator an electric stepper motor of an idle air control valve incorporating a journal in accordance with an embodiment of the invention.

For illustrative purposes, throughout the following discussion the invention is described as it is incorporated into a particular magnetic device used in a specific product assembly, namely an electric motor, generally indicated at 10, in the form of a stepper motor that provides linear actuation for an idle air control valve assembly 11 for a vehicle. However, the invention is equally applicable to other linear actuator devices that are employed in harsh environment.

Turning now to FIG. 1, the motor 10 includes a can stack stator assembly 12. The stator assembly 12 is preferably formed by field cup iron material around a plurality of pole plates 14a, 14b, 14c, and 14d. The stator assembly 12 could be otherwise constructed to hold the pole plates in a fixed position, such as by use of formed metal. The field cups and pole plates 14a through 14d are typically constructed of low carbon steel, such as AISI 1008 or 1010 steel or other suitable ferrous material, and are arranged in pairs. In the embodiment, the pole plates 14a through 14d are assembled in adjacent spaced apart pairs, 14a-14b and 14c-14d. The stator assembly 12 includes wells 16, 18 in the plastic located between the respective pairs of pole plates 14a-14b and 14c-14d. The wells 16, 18 accept respective wire wound coils 20, 22 of insulated copper wire or other suitable material, as represented in FIG. 1.

The stator assembly 12 has a passage 24 there-through for receipt of a rotor assembly 26. The rotor assembly 26 of the embodiment is constructed of suitable material such as a polyphenylene sulfide (PPS) plastic binder with permanent magnets of material such as bonded neodymium iron boron, sintered or bonded ferrite or other suitable magnetic materials known in the art.

In accordance with the embodiment, the stator assembly 12 is configured to receive a journal 28 to support and permit rotation of the rotor assembly 26 relative to the stator assembly 12 and about a central axis X. The journal 28 is preferably solid, but can be porous, and is preferably made of a lubricant impregnated polymer. Lubricant 30 such as silicone lithium soap grease or perflouropolyether (PFPE) grease separates the interface of the journal 28 and rotor assembly 26. Thus, by replacing the conventional ball bearing with a solid journal 28, seizing of the ball bearing due to contaminant exposure is reduced due to reduced moving/contact surfaces with minimal component change of the motor 10.

An electrical connector 25 is employed for providing a source of electrical current to the coil windings 20, 22. In embodiment of motor 10 as a stepper motor, introduction of a current in the coil windings 20, 22 of the stator assembly 12 causes rotational movement of the rotor assembly 26. The rotor assembly 26 has a threaded portion 32 for engagement with a threaded portion 34 of shaft 36. The shaft 36 is restricted from rotating via the front bearing 50. Therefore, rotational motion of rotor assembly 26 is converted into linear motion of shaft 36 via the threaded interface, making this stepper motor a linear actuator. One skilled in the art will appreciate that the present invention could be utilized in various alternative embodiments of magnetic devices regardless of whether such devices are of single or multiple phase construction. Moreover, in response to an electrical input, such alternative embodiments could be constructed to provide a different output such as in a rotary stepper motor, or in a motor which provides continuous rotary motion or the like.

In the embodiment of a motor 10 used in an idle air control valve 11 as illustrated in FIG. 1, the shaft 36 is coupled with a pintle 38 at its distal end. A spring 40 is nested around the distal end of the stator assembly 12 and a portion of the pintle 38. The spring 40 tends to bias the pintle 38 in an extended position. The pintle 38 receives an optional cylindrical grime shield 42 to reduce contamination of the motor 10 via grease on shaft 36.

With the example of the idle air control valve shown in FIG. 1, the motor 10 may be fitted within a bore 44 of an intake manifold or throttle body 46. The throttle body 46 includes a valve seat 48. The pintle 38 is moveable with respect to the valve seat to control airflow past the valve seat.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A linear actuator comprising:
   a stator assembly,
   a rotor assembly operatively associated with the stator assembly and mounted for rotation with respect to the stator assembly,
   a shaft restricted from rotation and associated with the rotor assembly such that rotation of the rotor assembly causes linear movement of the shaft,
   a journal, having no ball bearings, associated with the rotor assembly and disengaged with the shaft, the journal being constructed and arranged to support and permit rotation of the rotor assembly relative to the stator assembly, and
   lubricant between a surface of the journal and an adjacent surface of the rotor assembly.

2. The actuator of claim 1, wherein the journal is one of a solid or porous member.

3. The actuator of claim 1, wherein the journal is made of polymer.

4. The actuator of claim 3, wherein the polymer is lubricant impregnated.

5. The actuator of claim 1, wherein the lubricant is one of silicone lithium soap grease or perflouropolyether (PFPE) grease.

6. The actuator of claim 1, wherein the stator assembly includes coil windings and pole plates constructed and arranged, when properly energized, to cause rotation of the rotor assembly.

7. An idle air control valve for a vehicle comprising:
   a stator assembly,
   a rotor assembly operatively associated with the stator assembly and mounted for rotation with respect to the stator assembly,
   a shaft restricted from rotation and associated with the rotor assembly such that rotation of the rotor assembly causes linear movement of the shaft,
   a pintle associated with a distal end of the shaft for linear movement therewith,
   a journal, having no ball bearings, associated with the rotor assembly and disengaged with the shaft, the journal being constructed and arranged to support and permit rotation of the rotor assembly relative to the stator assembly, and
   lubricant between a surface of the journal and an adjacent surface of the rotor assembly.

8. The idle air control valve of claim 7, wherein the journal is one of a solid or porous member.

9. The idle air control valve of claim 7, wherein the journal is made of polymer.

10. The idle air control valve of claim 9, wherein the polymer is lubricant impregnated.

11. The idle air control valve of claim 7, wherein the lubricant is one of silicone lithium soap grease or perflouropolyether (PFPE) grease.

12. The idle air control valve of claim 7, wherein the stator assembly includes coil windings and pole plates constructed and arranged, when properly energized, to cause rotation of the rotor assembly.

13. The idle air control valve of claim 7, in combination with a throttle body of a vehicle, the throttle body having a valve seat, the pintle being movable with respect to the valve seat to control airflow past the valve seat.

14. An idle air control valve for a vehicle comprising:
   a stator assembly,
   a rotor assembly operatively associated with the stator assembly and mounted for rotation with respect to the stator assembly,
   a shaft restricted from rotation and associated with the rotor assembly such that rotation of the rotor assembly causes linear movement of the shaft,
   a pintle associated with a distal end of the shaft for linear movement therewith,
   means, having no ball bearings, associated with the rotor assembly and disengaged with the shaft, for supporting and permitting rotation of the rotor assembly relative to the stator assembly absent the use of ball bearings, and means, between a surface of the journal and an adjacent surface of the rotor assembly, for lubricating.

15. The idle air control valve of claim 14, wherein the means for supporting is a one of a solid or porous journal.

16. The idle air control valve of claim 15, wherein the journal is made of polymer.

17. The idle air control valve of claim 16, wherein the polymer is lubricant impregnated.

18. The idle air control valve of claim 14, wherein the means for lubricating is one of silicone lithium soap grease or perflouropolyether (PFPE) grease.

19. The idle air control valve of claim 14, wherein the stator assembly includes coil windings and pole plates constructed and arranged, when properly energized, to cause rotation of the rotor assembly.

20. The idle air control valve of claim 14, in combination with a throttle body of a vehicle, the throttle body having a valve seat, the pintle being movable with respect to the valve seat to control airflow past the valve seat.

* * * * *